US010259678B2

(12) United States Patent
Konate

(10) Patent No.: US 10,259,678 B2
(45) Date of Patent: Apr. 16, 2019

(54) TENSIONER FOR THE CONTROLLED CLAMPING AND FORWARD MOVEMENT OF AN ELONGATE ELEMENT

(71) Applicant: REEL, Saint-Cyr-au-Mont-d'Or (FR)

(72) Inventor: Karamoko Konate, Saint-Rogatien (FR)

(73) Assignee: REEL, Saint-Cyr-au-Mont-d'Or (FR)

( * ) Notice: Subject to any disclaimer, the term of this patent is extended or adjusted under 35 U.S.C. 154(b) by 115 days.

(21) Appl. No.: 15/422,564

(22) Filed: Feb. 2, 2017

(65) Prior Publication Data

US 2017/0225920 A1    Aug. 10, 2017

(30) Foreign Application Priority Data

Feb. 4, 2016  (FR) ..................... 16 50906

(51) Int. Cl.
*B65H 59/18* (2006.01)
*B65H 51/14* (2006.01)
*B65H 51/10* (2006.01)

(52) U.S. Cl.
CPC ........... *B65H 59/18* (2013.01); *B65H 51/105* (2013.01); *B65H 51/14* (2013.01)

(58) Field of Classification Search
CPC ...... B65H 51/105; B65H 51/10; B65H 51/28; B65H 51/14; B65H 59/18; F16L 1/23
See application file for complete search history.

(56) References Cited

U.S. PATENT DOCUMENTS

| 3,240,413 A | * | 3/1966 | Meister ................. | B65H 51/14 15/104.33 |
| 3,527,126 A | * | 9/1970 | Jones, Jr. ............... | B23B 13/00 226/176 |
| 4,285,454 A | * | 8/1981 | Plumettaz ............. | B65H 51/14 226/174 |

(Continued)

FOREIGN PATENT DOCUMENTS

FR    2 345 389 A1    10/1977

OTHER PUBLICATIONS machine translation of FR 2345389, retrieved Jul. 20, 2018 (Year: 1977).*

(Continued)

*Primary Examiner* — Michael C McCullough
(74) *Attorney, Agent, or Firm* — Young & Thompson

(57) ABSTRACT

A tensioner for the controlled clamping and forward movement of an elongate element, in particular for winding/unwinding a cable, a hose, a pipeline or an umbilical on a reception member. The tensioner comprises at least one frame that carries three guide boxes arranged around a passage axis. This tensioner comprises means for maneuvering these guide boxes, in particular second maneuvering means for the maneuvering in rectilinear, or at least substantially rectilinear, translation of lateral guide boxes, respectively in a direction defining an angle of between 115° and 125°, and preferably between 118° and 122°, with respect to said central plane. These second maneuvering means comprise at least one rocker element comprising a proximal end mounted so as to pivot on said frame and a distal end mounted so as to pivot on said lateral guide box, respectively about rotation axes extending parallel to said passage axis.

16 Claims, 3 Drawing Sheets

(56) References Cited

U.S. PATENT DOCUMENTS

| | | | |
|---|---|---|---|
| 6,439,445 B1 * | 8/2002 | De Groot | F16L 1/23 226/172 |
| 8,104,995 B2 * | 1/2012 | Roodenburg | F16L 1/23 226/172 |
| 9,216,879 B1 * | 12/2015 | Fuselier | B65H 51/10 |

OTHER PUBLICATIONS

French Search Report, dated Nov. 4, 2016, from corresponding French application.

* cited by examiner

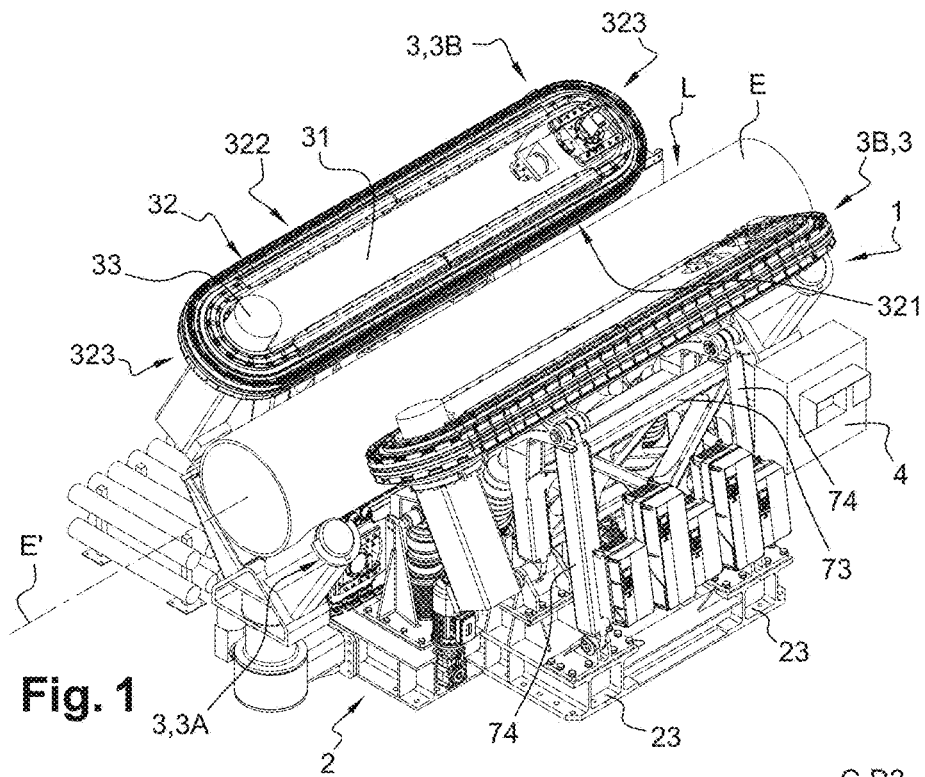
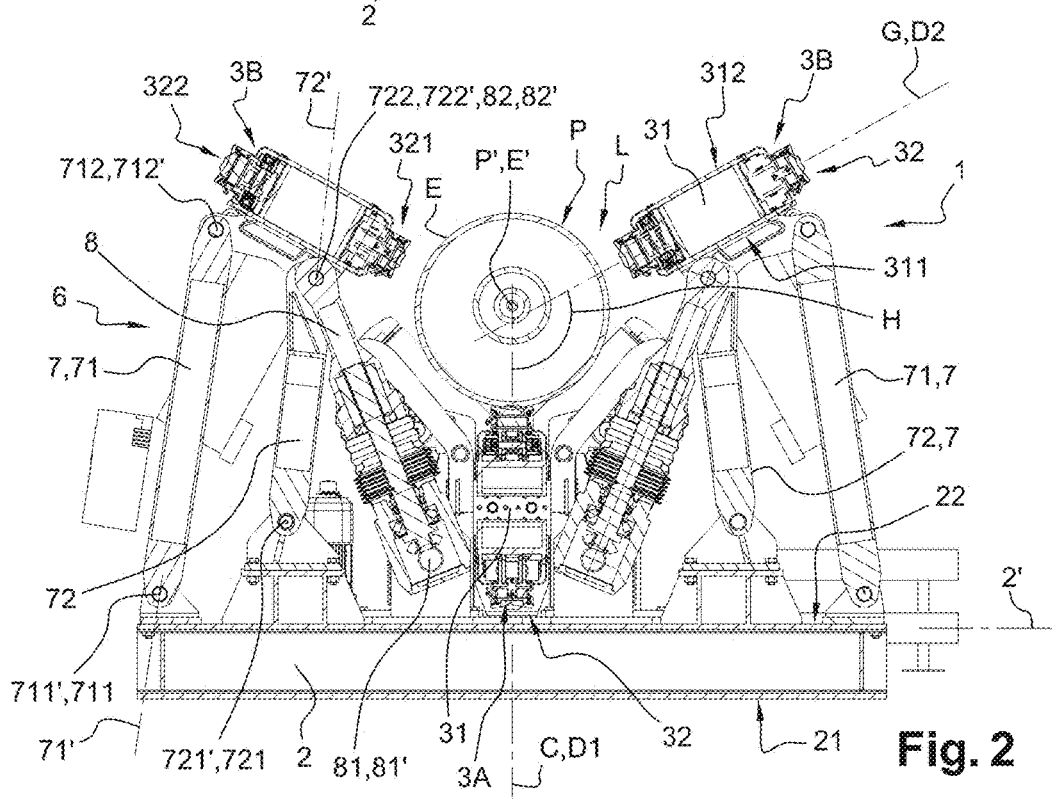

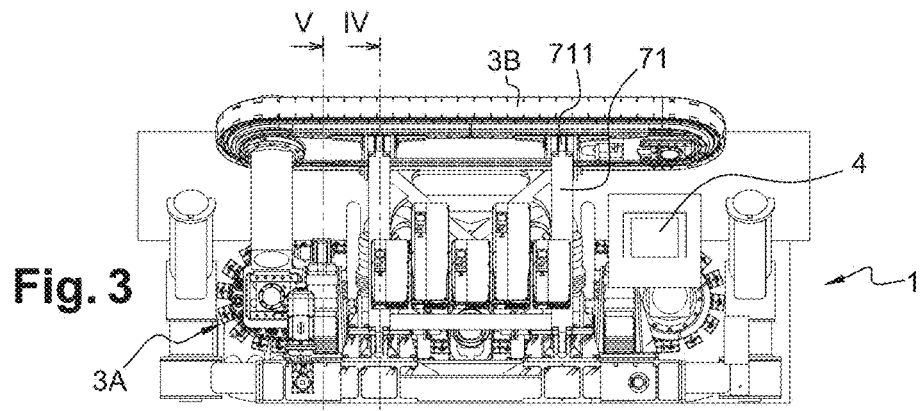
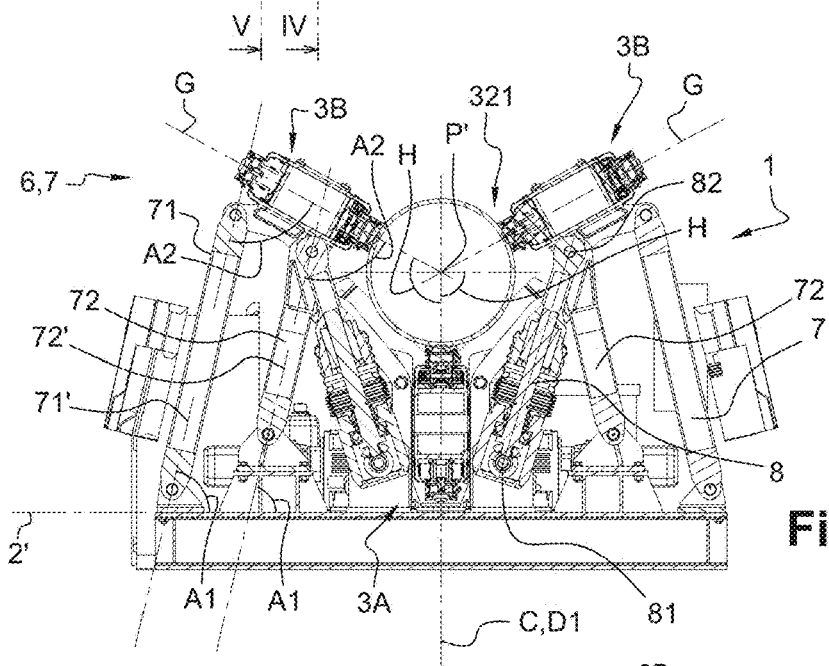
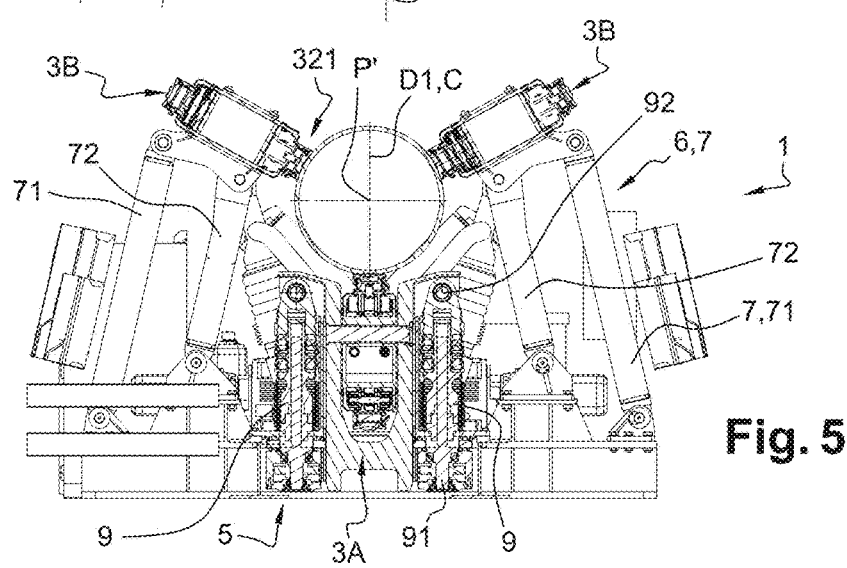

TENSIONER FOR THE CONTROLLED CLAMPING AND FORWARD MOVEMENT OF AN ELONGATE ELEMENT

TECHNICAL FIELD TO WHICH THE INVENTION RELATES

The present invention relates to a tensioner for the controlled clamping and forward movement of an elongate element, in particular for winding/unwinding a cable, a hose, a pipeline or an umbilical with respect to a reception member (for example a drum or cage).

TECHNOLOGICAL BACKGROUND

In various industrial fields, some elongate elements must be pulled, at constant speed and tension, for winding/unwinding thereof with respect to a reception member (a drum or cage for example).

This is in particular the case with the elongate elements used in the offshore field, namely cables, hoses, pipelines or umbilicals.

This maneuver is conventionally made by means of a device called a "tensioner", which provides firstly take-up by clamping a portion of the elongate element and secondly the longitudinal advancement of the latter.

For this purpose, there exist in particular tensioners that comprise a frame equipped with three guide boxes arranged around a passage axis:

a central guide box, which extends over a central plane passing through the passage axis, and two lateral guide boxes, which are arranged symmetrically with respect to said central plane.

This tensioner comprises control means that are suitable for controlling firstly a synchronous conveying, in the same direction, of a front strand of various guide boxes and secondly maneuvering means for adjusting an equidistant separation of these front strands of guide boxes with respect to the passage axis.

However, these current tensioners are not entirely satisfactory; in particular, putting the elongate element in the tensioner may prove to be relatively complex and tedious.

In particular, the frame is generally closed in operation in order to withstand the clamping forces. This frame must therefore be openable, in order to facilitate the introduction of the elongate element by a translation maneuver through the openable part of the frame. In addition, the maneuvering means of such tensioners are often relatively complex.

SUBJECT MATTER OF THE INVENTION

The invention therefore concerns a tensioner for the controlled clamping and advancement of an elongate element, in particular for winding/unwinding a cable, a hose, a pipeline or an umbilical with respect to a reception member (for example a drum or a cage).

This tensioner comprises at least one frame that carries three guide boxes arranged around a passage axis:

a central guide box that extends over a central plane passing through said passage axis, and two lateral guide boxes that are arranged symmetrically with respect to said central plane, each in a plane defining an angle of between 115° and 125°, and preferably between 118° and 122°, with respect to said central plane.

The guide boxes each comprise a support body on which a guide chain is guided, which is driven by at least one motorized wheel.

The guide chains each comprise a front strand, intended to provide a contact line on said elongate element, which extends parallel to and opposite said passage axis.

The guide boxes cooperate with said frame by means of maneuvering means.

The tensioner also comprises control means for controlling a synchronous conveying in the same direction of said front strands, and for adjusting an equidistant separation of said front strands with respect to said passage axis.

Said maneuvering means comprise:

(i) first maneuvering means for the maneuvering of said central guide box in rectilinear translation, in a direction oriented in said central plane and perpendicular to said passage axis, and (ii) second maneuvering means, comprising:

support means comprising at least one rocker element (named also pendulum or beam) comprising a proximal end mounted so as to pivot on said frame and a distal end mounted so as to pivot on said lateral guide box, respectively about rotation axes lying parallel to said passage axis, and actuator means for maneuvering said support means and said associated lateral guide box, for maneuvering each of said lateral guide boxes in rectilinear, or at least substantially rectilinear, translation, respectively in a direction defining an angle of between 115° and 125°, and preferably between 118° and 122°, with respect to said central plane.

Such a tensioner has the advantage of allowing rapid and effective placing of the elongate element in the tensioner.

This tensioner also has the advantage of being able to have an advantageous reception tolerance, for example between 40 mm and 700 mm, combined with a high traction and holding capability.

In addition, the maneuvering means are relatively simple, simplifying maintenance operations.

The tensioner may also be completely electric, without any functioning requiring hydraulic power.

Other non-limitative and advantageous features of the tensioner according to the invention, taken individually or in all technically possible combinations, are as follows:

the tensioner has a first angle defined between said at least one rocker element and an overall plane of the frame, and a second angle defined between said at least one rocker element and the associated lateral guide box; and the actuator means are arranged for a rotational maneuvering of said support means and of said associated lateral guide box, to cause an increase in said first angle proportionally to a reduction of said second angle, and vice versa;

the actuator means of the second maneuvering means comprise at least one linear actuator comprising a proximal end mounted so as to pivot on the frame and a distal end mounted so as to pivot on the lateral guide box, respectively about rotate axes lying parallel to the passage axis; in this case, preferably, the guide chain of each lateral guide box comprises said front strand and an opposite rear strand, and (i) the support means comprise an external rocker element, the distal end of which is situated at said rear strand, and (ii) the distal end of said at least one linear actuator is situated at the front strand;

at each lateral guide box, the support means comprise two rocker elements, namely an external rocker element and an internal rocker element provided between said external rocker element and the passage axis, and furthermore said rocker elements have a distance between axes corresponding to the distance between their respective rotation axes, and said external rocker element and said internal rocker element each have a distance between axes the strand of which is fixed; in this case, the guide chain of each lateral guide box comprises said front strand and an opposite rear strand, the distal end of the external rocker element is situated at said rear strand, the distal end of the internal rocker element is situated at the front strand, and, where applicable, said at least one linear actuator is arranged so that its distal end extends coaxially with the distal end of the internal rocker element, and its proximal end is provided between the central guide box and the proximal end of said internal rocker element;

the first maneuvering means comprise a system of linear actuators, said linear actuators being arranged parallel to the central plane and provided between said central guide box and said frame;

the passage axis extends horizontally, or at least approximately horizontally, and the central plane of the central guide box extends vertically, or at least approximately vertically;

the frame is in the general form of a plate comprising two opposite faces: a bottom face intended to rest on a reception element, and a top face cooperating with the proximal ends of the support means and, where applicable, with the proximal ends of the linear actuators of the actuator means;

the tensioner comprises a longitudinal opening that is defined between the front strands of the opposite lateral chambers, provided opposite the central guide box, the width of which depends on the separation of said front strands with respect to said passage axis;

the frame of the tensioner comprises at least two housings provided in parallel to and at a distance from each other, for receiving to the fork of a maneuvering device;

the motorized wheel consists of a wheel motorized by means of an electric motor and the maneuvering means comprise electric actuator means.

The present invention also relates to a system for maneuvering and storing an elongate element, in particular a cable, a hose, a pipeline or an umbilical, comprising:

a member for receiving said elongate element, for example a drum or a cage, and a tensioner as defined above.

The present invention also relates to a method for the controlled clamping and forward movement of an elongate element, in particular for winding/unwinding a cable, a hose, a pipeline or an umbilical with respect to a reception member, using a tensioner according to the invention.

This method comprises the following steps:

control of the means for maneuvering said tensioner, to increase the equidistant separation of the front strands of the guide chains of its guide boxes, with respect to the passage axis, placing of said elongate element on the central guide box of said tensioner, where applicable through its longitudinal opening;

control of the maneuvering means, to reduce the equidistant separation of said front strands with respect to the passage axis until each front strand gives rise to a contact line on said elongate element, synchronous conveying, in the same direction, of said front strands of the tensioner.

DETAILED DESCRIPTION IF AN EXAMPLE EMBODIMENT

The present invention will also be illustrated, without any limit, by the following description of a particular embodiment in relation to the accompanying figures, in which:

FIG. 1 is a perspective view of a tensioner according to the invention, in an inactive configuration in which the central guide box carries an elongate element and in which the lateral guide boxes are arranged at a distance from said elongate element;

FIG. 2 is a view in cross section of the tensioner shown in FIG. 1, along a transverse vertical cutting plane passing through the linear actuators for maneuvering the lateral guide boxes;

FIG. 3 is a side view of the tensioner shown in FIGS. 1 and 2, now in active configuration for the controlled clamping and forward movement of the attached elongate element;

FIG. 4 is a view in cross section of FIG. 3, along the plane IV-IV passing through one of the rocker elements forming a part of the means for maneuvering the lateral guide boxes and through the linear actuators for maneuvering the lateral guide boxes;

FIG. 5 is also a view in cross section of FIG. 3, here along the cutting plane V-V passing through the means for maneuvering the central guide box;

Figure 6:
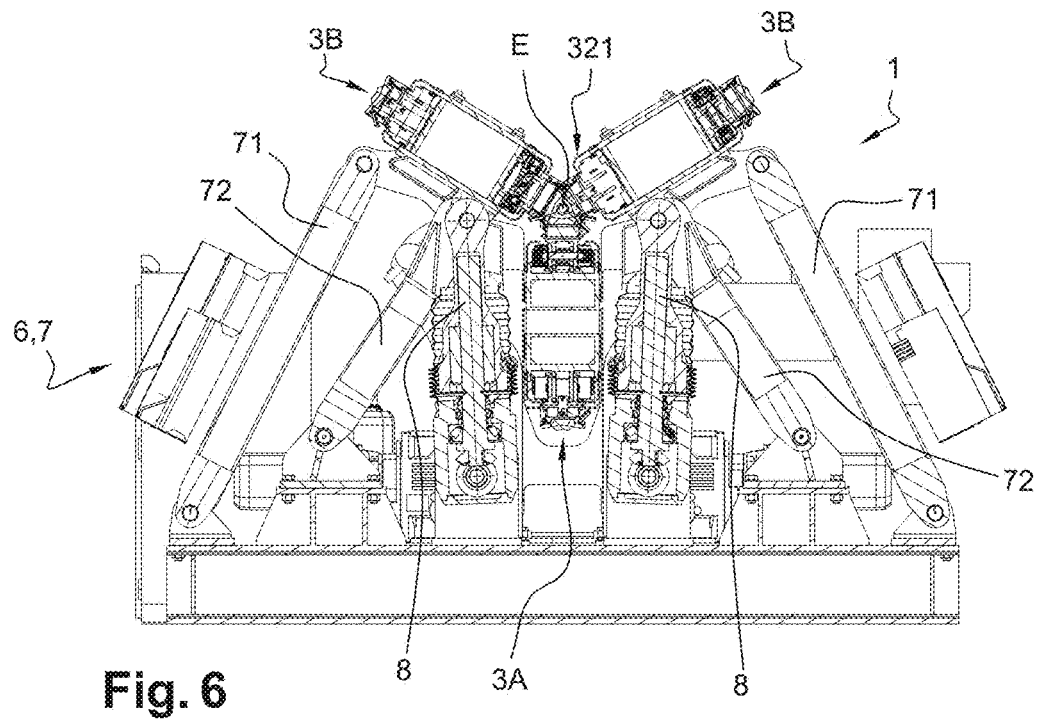
FIG. 6 is a view in cross section of the tensioner in active configuration around an elongate element, the diameter of which is reduced compared with that of FIGS. 4 and 5, along a plane corresponding the plane IV-IV in FIG. 3.

The tensioner 1 according to the invention is intended to equip a storage system comprising in particular a reception member (not shown) on/in which an elongate element E is intended to be stored.

The elongate element E consists advantageously of a cable, a hose, a pipeline or an umbilical. Such an elongate element E is advantageously used in the offshore field.

In general terms, this elongate element E has a cylindrical shape overall, with in particular a longitudinal axis E' and an external surface comprising a circular cross section.

The diameter of the elongate element E, able to be taken up by the tensioner 1 (also referred to as the "reception tolerance"), advantageous varies between 40 and 700 mm.

The reception member consists for example, in a manner that is conventional per se, of a drum or cage on/in which the elongate element E is intended to be wound/unwound.

Such a storage system belongs for example to an installation for manufacturing the elongate element E in which the latter is to be drawn, at constant speed and tension, from a unit for manufacturing said elongate element E as far as a storage unit (comprising the aforementioned member).

The storage system may then comprise a plurality of tensioners 1 installed in series, for maneuvering and guiding the elongate element E between two points of the storage system.

The tensioner 1 is able to ensure, in a way that is conventional per se, a taking up by gripping a portion of the elongate element E, and a controlled forward of movement of the latter (advantageously at constant speed and tension).

Tensioner According to the Invention

As described below in relation to FIGS. 1 and 2, the tensioner 1 according to the invention comprises a frame 2

(in the form of a horizontal platform) that carries three guide boxes 3 defining a passage P intended to receive a portion of the elongate element E.

The passage P of this tensioner 1 defines a longitudinal axis P', hereinafter designated "passage axis" (FIG. 2). This passage axis P' here extends horizontally, or at least approximately horizontally.

The guide boxes 3 are arranged regularly, or at least approximately regularly, around the longitudinal axis P' of the passage P.

The tensioner 1 thus comprises:
a central guide box 3A, extending over a central plane C passing through the passage axis P', and
two lateral guide boxes 3B, arranged symmetrically on either side of the aforementioned central plane C.

In this case, the central plane C of the central guide box 3A extends vertically, or at least approximately vertically. And the lateral chambers 3B are advantageously each arranged in a plane G defining an angle H (oriented on the same side as the frame 2) of between 115° and 125°, and preferably between 118° and 122°, with respect to the central plane C (FIG. 4).

The planes G of the two lateral chambers 3B are advantageously arranged so as to cut the central plane C along the same intersection straight line.

This intersection straight line is advantageously intended to extend coaxially, or at least approximately coaxially, with respect to the longitudinal axis P' of the passage P.

The three guide boxes 3 are identical. They each comprise a support body 31 on which a guide chain 32 is guided, which is driven by a motorized wheel 33.

The support body 31 has a roughly parallelepipedal shape, with two opposite faces 311, 312 (provided on either side of its general plane).

The motorized wheel 33 advantageously consists of a wheel motorized by means of an electric motor.

The guide chains 32 each have an oblong arrangement (FIG. 1), defining two parallel longitudinal strands (advantageously rectilinear), namely:
a front strand 321, intended to provide a contact line on the elongate element E, which extends parallel to and opposite the passage axis P', and
a rear strand 322, opposite.

These guide chains 32 also comprise two connecting strands 323, in an arc of a circle, which connect the front 321 and rear 322 strands.

The front strands 321 of the lateral guide boxes 3B define together a top longitudinal opening L, opening opposite the central guide box 3A and with a variable width (for example with a maximum width of between 800 and 1000 mm).

The front strands 321 of the three guide boxes 3 thus form generatrix lines of a virtual cylinder in which the passage P fits, and the longitudinal axis of which corresponds to the passage axis P'.

The diameter of this virtual cylinder is in addition variable so as to adapt to various diameters of the elongate element E. This clearance in diameter thus constitutes the tolerance range of the tensioner 1.

The guide boxes 3 are for this purpose able to move between two configurations:
an inactive configuration in which the lateral guide boxes 3B are provided at a distance from an elongate element E attached in the passage P (FIG. 2), and
an active configuration in which the front strands 321 of the three guide boxes 3 provide a contact line on the elongate element E attached in the passage P (corresponding to FIGS. 3 to 7).

To this end, the guide boxes 3 can be maneuvered in rectilinear, or at least substantially rectilinear, translation so as advantageously to maintain two arrangement parameters, namely:
an equidistant, or at least approximately equidistant, separation of their respective front strand 321 with respect to the passage axis P', and
a regular, or at least approximately regular, angular distribution around this passage axis P'.

These arrangement parameters are advantageously maintained at least in the tolerance range of the tensioner 1, for example for a travel of between 40 and 700 mm with respect to the passage axis P' (thus corresponding to the diameter of the elongate element E and of the passage P).

This particular maneuver of the guide boxes 3 is provided by:
control means 4, described in more detail hereinafter, and
maneuvering means 5, 6, suitable for moving the guide boxes 3.

The maneuvering means 5, 6 comprise:
first maneuvering means 5 (visible in particular in FIG. 5) for the rectilinear translational maneuvering of the central guide box 3A, in a direction D1 oriented in the central plane C and perpendicular to the passage axis P', and
second maneuvering means 6 (FIG. 2 in particular), for the rectilinear, or at least substantially rectilinear, translational maneuvering of each of the lateral guide boxes 3B, respectively in a direction D2 defining an angle of between 115° and 125°, and preferably between 118° and 122°, with respect to the central plane C (corresponding to the aforementioned angle H defined with the central plane C).

The second means 6 for maneuvering each lateral chamber 3B comprise:
support means 7 comprising rocker elements 71, 72 for forming a guide assembly of the deformable parallelogram/trapezium type, and
actuator means 8, for maneuvering the support means 7 and the associated lateral guide box 3B.

The support means 7 of each lateral guide box 3B comprise two rocker elements:
an external rocker element 71, and
an internal rocker element 72, provided between said external rocker element 71 on the one hand and the passage axis P' and the central guide box 3A on the other hand.

Each rocker element 71, 72 is in the general form of a stirrup or a U, comprising a horizontal cross member 73 connected by two vertical uprights 74 (FIG. 1).

The rocker elements 71, 72 are mounted so as to pivot between the frame 2 and the associated lateral guide box 3B, about rotation axes extending parallel to the passage axis P'.

The rocker elements 71, 72 and the associated lateral guide box 3B thus extend above and facing the frame 2.

Each rocker element 71, 72 comprises two ends:
a bottom proximal end 711, 721, mounted so as to pivot on the frame 2 about a rotation axis 711', 721', and
a top distal end 712, 722 that carries the associated lateral guide box 3B and is mounted so as to pivot on the latter about a rotation axis 712', 722'.

The various rotation axes 711', 712', 721', 722' extend parallel to the passage axis P' but also parallel with respect to one another.

These rocker elements 71, 72 each have a distance between axes (named also interaxial or axle base or center distance) corresponding to the distance separating their respective rotation axes 711'; 712'; 721'; 722'. The distance between axes of each rocker element 71, 72 has a fixed length.

The rocker elements 71, 72 have a particular arrangement and length ratio to provide the rectilinear, or at least approximately rectilinear, movement of the associated lateral guide box 3B.

This rectilinear, or at least approximately rectilinear, movement is advantageously maintained at least in the tolerance range of the tensioner 1, for example for a travel of between 40 and 700 mm with respect to the passage axis P'.

"Approximately rectilinear" includes a translational travel of the lateral guidance chamber 3B, optionally curvilinear, in which its plane G is maintained in a range of angles H (on the frame 2 side) of between 115° and 125°, and preferably between 118° and 122°, with respect to the central plane C (FIG. 2).

This thus includes a curvilinear translation of the front strand 321 of the lateral guide box 3B, but the general appearance of which is practically rectilinear because of the high value of the radius of the curvilinear translation and the short length of travel.

For this purpose, the two rocker elements 71, 72 carrying a lateral guide box 3B extend here parallel, or at least approximately parallel, with respect to each other.

The distal end 712 of the external rocker element 71 is situated level with the rear strand 322 of the associated lateral guide box 3B, secured to a bottom face 311 of its support body 31; the distal end 722 of the internal rocker element 72 is situated level with the front strand 321 of this same lateral guide box 3B, secured to the same bottom face 311 of its support body 31.

The external rocker element 71 has a distance between axes which is greater than the distance between axes of the internal rocker element 72.

For example, the interaxial value of the external rocker element 71 is between one and two times the inter-axis value of the internal rocker element 72.

The proximal end 721 of the internal rocker element 72 is also offset vertically with respect to the proximal end 711 of the external rocker element 71, upwards and on the same side as the passage axis P'.

This vertical offset added to the distance between axes of the internal rocker element 72 is less than the value of the inter-axis distance of the external rocker element 71.

Moreover, the distance between the proximal ends 711, 721 of the two rocker elements 71, 72 is identical, or at least approximately identical, to the distance separating the distal ends 712, 722 of these same rocker elements 71, 72.

Each rocker element 71, 72 also defines an overall plane that passes through its rotation axes 711', 712', 721', 722', designated respectively by the references 71', 72'.

Each rocker element 71, 72 thus defines two angles (FIG. 4):
- a first angle A1 delimited between the overall plane 71', 72' of this rocker element 71, 72 and the overall plane 2' of the frame 2, here horizontal (opening towards the central guide box 3A), and
- a second angle A2 delimited between the overall plane 71', 72' of this rocker element 71, 72 and the plane G of the associated lateral guide box 3B (also opening towards the central guide box 3A).

When one of the lateral guide boxes 3B moves, the first angle A1 and the second angle A2 change inversely with respect to each other.

In particular, when the guide boxes 3 move apart, the value of the first angle A1 increases proportionally to a reduction in the second angle A2; conversely, when the guide boxes 3 move closer, the value of the first angle A1 decreases proportionally to an increase in the second angle A2.

In this regard, the lateral guide box 3B follows a circular path around the rotation axis 711' of the proximal end 711 of the external rocker element 71, on a radius corresponding to the distance between axes of the latter.

Simultaneously, the lateral guide box 3B undergoes a rotation on itself, about the rotation axis 712' of the distal end 712 of this same external rocker element 71.

The actuator means 8 are arranged so as to control the rotation maneuver of the support means 7, thus causing a movement in rectilinear (or at least substantially rectilinear) translation of the associated lateral guide box 3B.

For this purpose, these actuator means 8 comprise here a linear actuator 8, advantageously a jack (for example an electric jack or a hydraulic jack).

This linear actuator 8 has two ends: —a proximal end 81, mounted so as to pivot on the frame 2, and —a distal end 82, mounted so as to pivot on the lateral guide box 3B.

These ends 81, 82 define respectively rotation axes 81' and 82' that also extend parallel to the passage axis P'.

The distal end 82 of the linear actuator 8 is situated level with the front strand 321 of the lateral guide box 3B. Its rotation axis 81' advantageously extends coaxially with respect to the pivot axis 722' of the distal end 722 of the internal rocker element 72.

This arrangement makes it possible to optimize the traction force exerted by the linear actuator 8 on the lateral guide box 3B.

The proximal end 81 of this linear actuator 8 for its part is situated in the space lying between the proximal end 722 of the rocker element 72 and the central guide box 3A.

For their part, the first maneuvering means 5 comprise a system of linear actuators 9, advantageously a set of jacks (for example electric jacks or hydraulic jacks) (FIG. 5).

The linear actuators 9 are arranged parallel to the central plane C and are each oriented on a vertical (or at least approximately vertical) axis.

Each linear actuator 9 comprises two ends: —a proximal end 91, bottom and fixed, secured to the frame 2, and —a distal end 92, top and movable, secured to the central guide box 3A (in particular to its support body 31).

The frame 2 is in the general form of a horizontal plate having two opposite faces (FIG. 2 in particular):
- a bottom face 21, intended to rest on and be fixed to a reception element, for example the deck of a ship or the floor of a factory, and
- a top face 22, facing which the guide boxes 3 extend.

This top face 22 thus cooperates with firstly the proximal ends 711, 721 of the rocker elements 71, 72 and secondly the proximal end 81, 91 of the linear actuators 8, 9.

This arrangement thus helps to form the top longitudinal opening L, opening up opposite the central guide box 3A.

The frame 2 also advantageously comprises two housings 23 provided parallel to and at a distance from each other (FIG. 1), for receiving the fork of a maneuvering device (not shown).

The control means 4 fulfill two main functions:
- controlling the synchronous conveying, in the same direction, of the front strands 321 of the guide boxes 3, and
- controlling the maneuvering means 5, 6, so as to maintain the equidistant separation of the front strands 321 of these guide boxes 3 with respect to the passage axis P' and so as to (at least approximately) fix the position of this passage axis P'.

For this purpose the control means 4 comprise means of the computer type associated with a computer program.

The computer integrates in particular a programmable automaton, associated with absolute coders secured to/coupled with the linear actuators.

The computer program advantageously comprises:
first program code means suitable for controlling the motorized wheel 33 of the guide boxes 3, to obtain the synchronous conveying of the front strands 321 in the same direction, and
second program code means suitable for controlling the maneuvering means 5, 6, so as to maintain the equidistant separation of the front strands 321 of the guide boxes 3 with respect to the passage axis P', when said computer program is executed by said control means 4.

In particular, the second program code means are suitable for generating an identical travel, in terms of length and in the same direction (separation or bringing together), of the front strands 321 of the three guide boxes 3 with respect to the passage axis P'.

Use of the Tensioner According to the Invention

In practice, the control means 4 will allow the controlled clamping and forward movement of the elongate element E.

For placing an elongate element E in the passage P, the control means 4 control the maneuvering means 5, 6 of the tensioner 1 in an inactive configuration (FIGS. 1 and 2).

To this end, the separation of each of the front strands 321 with respect to the passage axis P' is increased by a travel that is identical in length.

For this purpose, firstly, the central guide box 3A undergoes a downward vertical rectilinear translation in the direction D1. This movement is obtained by the retraction of the dedicated linear actuators 9.

Moreover, each of the lateral chambers 3B undergoes a rectilinear, or at least substantially rectilinear, translation inclined upwards and separating with respect to the passage axis P', respectively in the aforementioned direction D2. This movement is obtained by the outward tilting of its rocker elements 71, 72 because of the deployment of its dedicated linear actuators 8.

This maneuvering makes it possible in particular to increase the width of the top longitudinal opening L delimited by the facing front strands 321 of the two lateral guide boxes 3B. Thus, if necessary, the top longitudinal opening L is adjusted so that its width is greater than the diameter of the elongate element E to be attached.

The elongate element E can then be placed in the passage P, where necessary through the top longitudinal opening L, so as to come to rest on the front strand 321 of the central guide box 3A (FIGS. 1 and 2).

The control means 4 next control the maneuvering means 5, 6 so as to reduce the equidistant separation of the front strands 321 with respect to the passage axis P', until each front strand 321 generates a contact line on the elongate element E (FIGS. 3 to 7).

For this purpose:
the central guide box 3A undergoes an upward vertical rectilinear translation in the aforementioned direction D1 through the deployment of the dedicated linear actuators 9, and
each of the lateral guide boxes 3B undergoes a rectilinear, or at least substantially rectilinear, downwardly inclined translation in the direction of the passage P', respectively in the aforementioned direction D2, obtained by the inward tilting of its rocker elements 71, 72 because of the retraction of its dedicated linear actuators 8.

FIGS. 4 to 7 illustrate the tolerance range of the tensioner 1, with two different diameters of elongate elements E able to be taken up by the tensioner 1.

Figure 7:
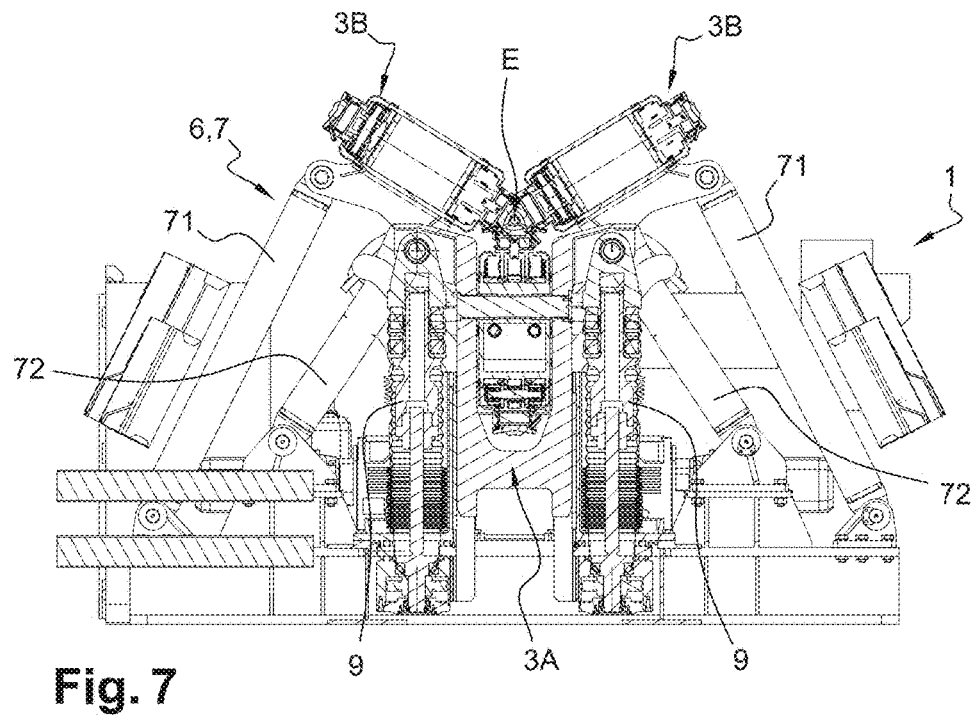
FIG. 7 is a view in cross section of the tensioner in active configuration around an elongate element according to FIG. 6, along a plane corresponding to the cutting plane V-V in FIG. 3.

For example, FIGS. 4 and 5 illustrate the taking up of an elongate element E with a diameter of around 700 mm; FIGS. 6 and 7 illustrate the taking up of an elongate element E with a diameter of around 40 mm.

In this active configuration, the control means 4 next cause a synchronous conveying, in the same direction, of the front strands 321 of the tensioner 1 so as to cause the required movement of the elongate element E (at a required speed in a required direction).

In the case of tensioners 1 mounted in series, their respective control means 4 can advantageously be controlled in a centralized fashion so as to coordinate the synchronous conveying in the same direction of the front strands 321 of these tensioners 1.

At the end of traction, the control means 4 can once again control the maneuvering means 5, 6 of the tensioner 1 in inactive configuration (FIGS. 1 and 2), so as to release the elongate element E.

In general terms, the capacity of this tensioner 1, under traction and holding, is advantageously around 10 to 20 tonnes.

This tensioner can be used to wind cables under tension on the drums of winches, on a dock or directly mounted on board boats. It can also be used to unwind/wind hoses, rigid pipelines and/or umbilicals.

The tensioner can be handled by means of a forklift truck.

It is possible to load it in a special container in order to be able to transport it without difficulty, or to be able to install bolted mechanical protection for protecting fragile components, in particular the electrical components and the shoes.

The invention claimed is:

1. A tensioner for the gripping and the controlled forward movement of an elongate element (E), said tensioner (1) comprising:
   at least one frame (2) that carries three guide boxes (3) arranged around a passage axis (P'), as follows:
      one of said three guide boxes being a central guide box (3A), which extends over a central plane (C) passing through said passage axis (P'), and
      two of said three guide boxes being two lateral guide boxes (3B), which are arranged symmetrically with respect to said central plane (3), said lateral guide boxes (3B) each being arranged in a plane (G) defining an angle (H) of between 115° and 125° with respect to said central plane (C),
   said guide boxes (3) each comprising a support body (31) on which a guide chain (32) is guided, which is driven by at least one motorized wheel (33),
   said guide chains (3) each comprising a front strand (321), intended to provide a contact line on said elongate element (E), which extends parallel to and opposite said passage axis (P'),
   said guide boxes (3) cooperating with said frame (2) by means of maneuvering means (5, 6), and
   said tensioner (1) comprises control means (4) for controlling a synchronous conveying in the same direction of said front strands (321) and for adjusting an equidistant separation of said front strands (321) with respect to said passage axis (P'),
   wherein said maneuvering means (5, 6) comprise:

(i) first maneuvering means (5) for the maneuvering of said central guide box (3A) in rectilinear translation, in a direction (D1) oriented in said central plane (C) and perpendicular to said passage axis (P'), and (ii) second maneuvering means (6), comprising:
support means (7) comprising at least one rocker means (71, 72) comprising a proximal end (711, 722) mounted so as to pivot on said frame (3B) and a distal end (712, 722) mounted so as to pivot on said lateral guide box (3B), respectively about rotation axes (711', 712', 721', 722') lying parallel to said passage axis (P'), and actuator means (8) for maneuvering said support means (7) and said associated lateral guide box (3B), for maneuvering each of said lateral guide boxes (3B) in rectilinear, or at least substantially rectilinear, translation, respectively in a direction (D2) defining an angle (H) of between 115° and 125° with respect to said central plane (C), wherein the actuator means (8) of the second maneuvering means (6) comprise at least one linear actuator (8) comprising a proximal end (81) mounted so as pivot on the frame (2) and a distal end (82) mounted so as to pivot on the lateral guide box (3B), respectively about rotation axes (81', 82') extending parallel to the passage axis (P'), wherein the guide chain (32) of each lateral guide box (3B) comprises the front strand (321) and an opposite rear strand (322), wherein the support means (7) comprise an external rocker element (71) the distal end (712) of which is situated level with said rear strand (322), and wherein the distal end (82) of said at least one linear actuator (8) is situated at the front strand (321).

2. The tensioner according to claim 1,
wherein, at each lateral guide box (3B), the support means (7) comprise two rocker elements:
an external rocker element (71), and
an internal rocker element (72), provided between said external rocker element (71) and the passage axis (P'),
wherein said rocker elements (71, 72) have a distance between centers corresponding to the distance between their respective rotation axes (711'; 712'; 721'; 722'), and
wherein said external rocker element (71) and said internal rocker element (72) each comprise a distance between centers the length of which is fixed.

3. The tensioner according to claim 2,
wherein the distal end (712) of the external rocker element (71) is situated level with said rear strand (322), and
wherein the distal end (722) of the internal rocker element (72) is situated level with the front strand (321).

4. The tensioner according to claim 3, wherein said at least one linear actuator (8) is arranged so that:
the distal end (82) of the at least one linear actuator (8) extends coaxially with the distal end (711) of the internal rocker element (72), and
the proximal end (81) of the at least one linear actuator (8) is provided between the central guide box (3A) and the proximal end (721) of said internal rocker element (72).

5. The tensioner according to claim 2, wherein the first maneuvering means (5) comprise a system of linear actuators (9), arranged parallel to the central plane (C) and provided between said central guide box (3A) and said frame (2).

6. The tensioner according to claim 2,
wherein passage axis (P') extends horizontally, or at least approximately horizontally, and
wherein the central plane (C) of the central guide box (3A) extends vertically, or at least approximately vertically.

7. The tensioner according to claim 1, wherein the first maneuvering means (5) comprise a system of linear actuators (9), arranged parallel to the central plane (C) and provided between said central guide box (3A) and said frame (2).

8. The tensioner according to claim 3, wherein the first maneuvering means (5) comprise a system of linear actuators (9), arranged parallel to the central plane (C) and provided between said central guide box (3A) and said frame (2).

9. The tensioner according to claim 1,
wherein passage axis (P') extends horizontally, or at least approximately horizontally, and
wherein the central plane (C) of the central guide box (3A) extends vertically, or at least approximately vertically.

10. The tensioner according to claim 1, wherein the frame (2) is in the general form of a plate comprising two opposite faces:
a bottom face (21) configured to rest on a reception element, and
a top face (22) cooperating with the proximal ends (711, 721) of the support means (7) and configured to cooperate with the proximal ends (81) of the at least one linear actuator (8) of the actuator means (8).

11. The tensioner according to claim 1, further comprising:
a longitudinal opening (L) that is defined between the front strands (321) of the lateral guide boxes (3B) opposite, provided opposite the central guide box (3A), the width of which depends on the separation of said front strands (321) with respect to said passage axis (P').

12. A method for controlled clamping and forward movement of an elongate element (E), comprising:
using a tensioner according to claim 1;
controlling the means (5, 6) for maneuvering said tensioner (1), to increase the equidistant separation of the front strands (321) of the guide chains (3) with respect to the passage axis (P');
placing said elongate element (E) on the central guide box (3A) of said tensioner (1), through the longitudinal opening (L);
controlling the maneuvering means (5, 6), to reduce the equidistant separation of the front strands (321) with respect to the passage axis (P') until each front strand (321) gives rise to a contact line on said elongate element (E);
synchronous conveying, in the same direction, of said front strands (321) of the tensioner (1).

13. The tensioner of claim 1, wherein the actuator means maneuvers each of said lateral guide boxes (3B) translation, respectively in a direction (D2) defining an angle (H) of between 118° and 122° with respect to said central plane (C).

14. A tensioner for the gripping and the controlled forward movement of an elongate element (E), said tensioner (1) comprising:
at least one frame (2) that carries three guide boxes (3) arranged around a passage axis (P'), as follows:

one of said three guide boxes being a central guide box (3A), which extends over a central plane (C) passing through said passage axis (P'), and two of said three guide boxes being two lateral guide boxes (3B), which are arranged symmetrically with respect to said central plane (3), said lateral guide boxes (3B) each being arranged in a plane (G) defining an angle (H) of between 115° and 125° with respect to said central plane (C), said guide boxes (3) each comprising a support body (31) on which a guide chain (32) is guided, which is driven by at least one motorized wheel (33), said guide chains (3) each comprising a front strand (321), intended to provide a contact line on said elongate element (E), which extends parallel to and opposite said passage axis (P'), said guide boxes (3) cooperating with said frame (2) by means of maneuvering means (5, 6), and said tensioner (1) comprises control means (4) for controlling a synchronous conveying in the same direction of said front strands (321) and for adjusting an equidistant separation of said front strands (321) with respect to said passage axis (P'), wherein said maneuvering means (5, 6) comprise:

(i) first maneuvering means (5) for the maneuvering of said central guide box (3A) in rectilinear translation, in a direction (D1) oriented in said central plane (C) and perpendicular to said passage axis (P'), and (ii) second maneuvering means (6), comprising:

support means (7) comprising at least one rocker means (71, 72) comprising a proximal end (711, 722) mounted so as to pivot on said frame (3B) and a distal end (712, 722) mounted so as to pivot on said lateral guide box (3B), respectively about rotation axes (711', 712', 721', 722') lying parallel to said passage axis (P'), and actuator means (8) for maneuvering said support means (7) and said associated lateral guide box (3B), for maneuvering each of said lateral guide boxes (3B) in rectilinear, or at least substantially rectilinear, translation, respectively in a direction (D2) defining an angle (H) of between 115° and 125° with respect to said central plane (C), wherein, at each lateral guide box (3B), the support means (7) comprise two rocker elements:

an external rocker element (71), and an internal rocker element (72), provided between said external rocker element (71) and the passage axis (P'), wherein said rocker elements (71, 72) have a distance between centers corresponding to the distance between their respective rotation axes (711'; 712'; 721'; 722'), wherein said external rocker element (71) and said internal rocker element (72) each comprise a distance between centers the length of which is fixed, wherein the guide chain (32) of each lateral guide box (3B) comprises the front strand (321) and an opposite rear strand (322), wherein the distal end (712) of the external rocker element (71) is situated level with said rear strand (322), and wherein the distal end (722) of the internal rocker element (72) is situated level with the front strand (321).

15. The tensioner according to claim 14, wherein the actuator means (8) of the second maneuvering means (6) comprise at least one linear actuator (8), wherein said at least one linear actuator (8) is arranged so that:

a distal end (82) of the at least one linear actuator (8) extends coaxially with the distal end (711) of the internal rocker element (72), and a proximal end (81) of the at least one linear actuator (8) is provided between the central guide box (3A) and the proximal end (721) of said internal rocker element (72).

16. The tensioner according to claim 14, wherein the first maneuvering means (5) comprise a system of linear actuators (9), arranged parallel to the central plane (C) and provided between said central guide box (3A) and said frame (2).

* * * * *